United States Patent [19]
Holdsworth et al.

[11] 3,906,052
[45] Sept. 16, 1975

[54] DICHLOROFLUOROMETHYLCYCLOPROPANES

[75] Inventors: Robert S. Holdsworth, Arlington; Charles A. Billings, Concord; Gerald J. O'Neill, Arlington, all of Mass.

[73] Assignee: W. R. Grace & Co., Cambridge, Mass.

[22] Filed: Jan. 10, 1975

[21] Appl. No.: 539,985

[52] U.S. Cl. .............................. 260/648 F; 424/352
[51] Int. Cl.² ......................................... C07C 23/04
[58] Field of Search ................................ 260/648 F

[56] References Cited
OTHER PUBLICATIONS
Moss et al. Tetrahedron, 1967 23 2549–2556.

*Primary Examiner*—D. Horwitz
*Attorney, Agent, or Firm*—Armand McMillan; C. E. Parker

[57] ABSTRACT

The following dichlorofluoromethylcyclopropanes have been synthesized and found to possess utility as general inhalation anesthetics: 1,1-dichloro-2-methyl-2,3,3-trifluorocyclopropane and 1,2-dichloro-1-fluoro-2-methylcyclopropane.

1 Claim, No Drawings

DICHLOROFLUOROMETHYLCYCLOPROPANES

THE PRIOR ART

In the continuing search for general inhalation anesthetics, there has been recently discovered one monochlorocyclopropane and a few monochloromethylcyclopropanes. These compounds are disclosed in U.S. Pat. No. 3,825,606 and in copending application Ser. No. 528,123 filed on Nov. 29, 1974. The synthesis of more highly chlorinated fully substituted cyclopropanes, including di-, tri- and tetrachloro- compounds, has also been reported [J. Chem. Soc. 1970, 178; J. Chem. Soc. Perkin I, 107, 1071 and 1773 (1973)] but none of these compounds have been disclosed to possess anesthetic properties. The only known cyclopropane compounds with a claim to anesthetic utility prior to the current contributions of the applicants have been cyclopropane itself and the 1-methyl-1-trifluoromethylcyclopropane reported by Krantz and Rudo[Handbuch of Experimental Pharmakologie 20 (1) at page 525 (1966)]. As to dichlorocycloalkanes, such as those presently disclosed, the only compound found in the art is the 1,2-dichlorohexafluorocyclobutane. It is toxic [Burns et al., Anaesthesia 16 No. 1, page 14 (Jan. 1961)].

Thus, despite the disclosures in recent years, it can be reasonably said that little has been added to the understanding of the mode of action of chemical compounds in this physiological role and, because of this, the relationship of the similarities and differences between fairly similar compounds with either their toxic or therapeutic properties remains substantially unidentified. The discovery of additional substances possessing a desirable combination of properties for anesthetic purposes still lies, therefore, beyond the scope of routine expertise.

SUMMARY OF THE INVENTION

Two new halogenated methylcyclopropanes have been synthesized and found to be useful general inhalation anesthetics. They are 1,1-dichloro-2-methyl-2,3,3-trifluorocyclopropane and 1,2-dichloro-1-fluoro-2-methylcyclopropane.

DETAILED DESCRIPTION

The chlorocyclopropanes of this invention may be synthesized by any of several methods depending on the availability of starting materials and on the yield considered acceptable under the circumstances. The methods actually used in the preparation of the instant compounds are illustrated in the following examples.

EXAMPLE 1

One of the compounds studied was synthesized by the thermal decomposition of trichloromethyltrifluorosilane in the presence of the appropriate olefin, according to a method disclosed in J. Chemical Soc., Perkin I, 1071–8 (1973). The trichloromethyltrifluorosilane in turn was prepared by chlorination of methyltrichlorosilane [Chem. Ber. 87, 282–7 (1954)] followed by fluorination of the trichloromethyltrichlorosilane by antimony trifluoride [Ber. 97 (6), 1673–6 (1964)].

Specifically, the cyclization was carried out in a clean dry stainless steel autoclave. The trichloromethyltrifluorosilane, 0.42 mole, and the olefin, 0.46 mole of 1,1,2-trifluoro-prop-1-ene, were placed in the container and the mixture heated at 140°–5°C for 20 to 24 hours. The vacuum distillate obtained from the autoclave was washed with aqueous base. The product obtained, 1,1-dichloro-2-methyltrifluorocyclopropane, had a boiling point of 86.5°C, a density of 1.434 ($d_4^{20}$) and a refractive index of 1.3860 ($n_D^{20}$). The yield, based on the silane, was 64% by weight.

EXAMPLE 2

1,2-Dichloro-1-fluoro-2-methylcyclopropane also was prepared by the cyclization of a halocarbene with an olefin. The carbene, :CFCl, was generated in concentrated sodium hydroxide solution from dichlorofluoromethane with the assistance of triethylbenzylammonium bromide [Synthesis 2, 112 (1973)].

A stainless steel autoclave was used to which were added 400 g of 50% aqueous sodium hydroxide and 2 g of triethylbenzylammonium bromide. The container was sealed, evacuated of air and cooled to −75°C. 2-Chloropropene 1.2 mole, and dichlorofluoromethane, 1.55 moles, were introduced. After the autoclave had warmed to 0° to 20°C and the agitator had become free, stirring was carried out for 20 hours. The product was obtained by vacuum distillation and separation from the water in a funnel, in yield of 42% on the methane. The purified product had a boiling point of 100°C, a density ($d_4^{20}$) of 1.252 and a refractive index ($n_D^{25}$) of 1.4216.

EXAMPLES 3 and 4

The physiological effects of the cyclopropanes prepared in the preceding examples were demonstrated as follows, using a standard test for evaluation of inhalation anesthetics similar to that described in Robbins [J. Pharmacology and Experimental Therapeutic 86, 197 (1946)].

Mice were exposed to the anesthetic for a period of 10 minutes in a rotating drum. Observations were then made of the pinch reflex, the corneal reflex and the return of the righting reflex. At least four graded doses were employed to determine the minimum concentration required to anesthetize 50% of the mice used ($AC_{50}$) and the minimum concentration required to kill 50% of the mice ($LC_{50}$). The anesthetic index (AI) was then calculated from these minimum concentrations. The results of these tests are summarized in the following table.

ANESTHETIC PROPERTIES OF
DICHLOROMETHYLCYCLOPROPANES

| Ex. | Cyclopropane | $AC_{50}$ (% Volume) | $LC_{50}$ (% Volume) | AI ($LC_{50}/AC_{50}$) |
|---|---|---|---|---|
| 8 | 1,1-diCl-2-$CH_3$-TriF- | < 1% | 4–6%* | 4–6 |
| 9 | 1,2-diCl-1-F-2-$CH_3$ | < 1% | 2–4% | > 2 |

*Where two figures are given, the actual value lies between them.

The compounds of this invention are therefore capable of inducing a state of anesthesia in air-breathing mammals, from which the latter recover, provided that the lethal concentration of anesthetic vapors is not reached. The compounds can be stored in containers of the type commonly used for conventional anesthetics of comparable boiling point, e.g. halothane, and they may be used in admixture with pharaceutically acceptable diluents and stabilizers such as thymol, or in combination with one or more of the known inhalation anesthetics, such as nitrous oxide, ether, halothane, chloroform, methoxyflurane and the like. In short, it should be understood that variations can be carried out in either the preparation of the administration of these compounds depending on factors such as economic considerations, level and duration of anesthesia desired, subject treated, and the like.

What is claimed is:

1. The dichloromethylcyclopropanes selected from the group consisting of 1,1-dichloro-2-methyl-2,3,3-trifluorocyclopropane and 1,2-dichloro-1-fluoro-2-methylcyclopropane.

* * * * *